United States Patent Office 3,845,229
Patented Oct. 29, 1974

3,845,229
METHOD OF PREPARING SOYBEAN PRODUCTS FREE OF ANTITRYPSIN
Michel Rambaud, Paris, France, assignor to Societe Industrielle des Oleagineux, Paris, France
No Drawing. Continuation of abandoned application Ser. No. 841,563, July 14, 1969. This application Mar. 27, 1972, Ser. No. 238,712
Int. Cl. A23l 1/20
U.S. Cl. 426—375                                6 Claims

ABSTRACT OF THE DISCLOSURE

Soybean cooking process by carrying out the cooking at a pH below 9 preferably 8.0–8.5 at a temperature of 100–110° C., for extracted or unextracted soybeans.

This application is a continuation of copending application Ser. No. 841,563, filed July 14, 1969 and now abandoned.

BACKGROUND OF THE INVENTION

1. Field of the Invention

This invention relates to the treatment of soybean by cooking, both are extracted and oil unextracted soybeans.

2. Description of the Prior Art

It is known in fact that the reason for the poor alimentary value of soybeans is the presence therein of undesirable compounds, the most important of which is anti-trypsin. Considerable research has been done with a view to achieving the destruction of anti-trypsin, which inhibits tryptic proteolysis and, even in small doses, produces harmful secondary reactions.

It has now been found that antitrypsin disappears from oil extracted and unextracted soybeans when they are subjected to high temperature cooking, particularly steam cooking. This treatment however is not free from disadvantages.

If the cooking is effected at too high a temperature or if it is prolonged with a view to destroying antitrypsin, this treatment gives rise to excessive denaturation of the proteins, a reduction of the solubility of the latter in water, and an increase of soda insoluble matter.

It is for this reason that it has been found necessary to establish cooking standards which preserve the proteins.

The studies carried out by the applicant have however revealed that with these standards the complete destruction of antitrypsin is not achieved. The cooked products still contain antitrypsin, and this comprises not only the quantity which can be determined by usual methods but in addition a considerable amount which can be detected after careful hydrochloric treatment.

Determinations made have shown that this amount of antitrypsin which can be detected after hydrochloric treatment was of the order of 2% of the original antitrypsin in the product. It is clear that, in vivo, during stomachal digestion of the soybeans this antitrypsin will be liberated by rennet or pepsin, so that the alimentary value of the product is reduced.

In order to overcome these difficulties the applicant proposed in U.S. Pat. No. 3,220,851 a method of treatment, particularly for soybeans, which consists in effecting careful cooking under defined conditions of concentration, while maintaining the pH at a value close to 9 in a liquid medium. This method gives excellent results and leads to the complete destruction of the antitrypsin but it is relatively complex to carry out.

The main object of the present invention is to provide a method of treating soybeans by cooking which overcomes these disadvantages and leads to a product of high alimentary value which is substantially free from antitrypsin, even as revealed after hydrochloric treatment, by simple means which were capable of use in traditional soya oil works without modifying equipment or substantially increasing cost of manufacture.

SUMMARY

A method of processing unextracted soybeans for eliminating the antitrypsic factor, comprising adjusting the pH value of the soybeans to 8–9 by means of an alkalizing reagent, the amount of alkalizing reagent being for 100 parts of soybeans by weight, treating the soybeans with steam to raise the temperature of the soybeans to 100–110° C. and cooking the soybeans at this temperature.

The humidity necessary for the reaction of destroying the antitrypsin is primarily supplied by the condensation of the steam and the duration of the cooking treatment will depend on this humidity, which in turn is dependent on whether or not oil has been extracted, because it is necessary to supply the heat of evaporation of the solvent.

Adjustment of the pH value entails the addition of an alkalizing reagent by spraying of a concentrated suspension or solution over the crushed grains, the humidity of which is at most 12%, thus enabling the reagent to be distributed uniformly during the rolling, an operation which normally follows the crushing and in the course of which flakes of a thickness of 20 to 40 hundredths of a millimetre are obtained.

The reagent used may for example be a caustic soda or ammonia solution or milk of lime. The amounts used per 100 parts of beans are:

NaOH—0.1 to 0.6, preferably 0.3
CaO—0.1 to 0.5, preferably 0.2
$NH_3$—0.05 to 0.4, preferably 0.15.

The amount of water, the reagent vehicle, represents less than 2% of the weight of the soybeans, generally 1% or less.

Another method which has been found advantageous comprises spraying a solution of urea over the starting material. If, in particular, crushed soybeans are used for this operation, the sprayed urea is distributed in the soybean during the rolling which normally follows the grinding. The natural urease of the beans converts the urea into ammonia by enzymatic action in actual contact with the proteins, and thus with the antitrypsin to be inactivated, thus raising the pH of the material by ammoniacal alkalisation within the material itself. The urease is not inactivated unless the soybean is heated to a temperature higher than 70° C. before rolling.

The use of urea prevents any accidental local overalkalisation which might degrade the sulphur amino acids, because the enzymatic reaction slows down itself when the pH is too high. The amount of urea is from 0.1 to 0.4% by weight referred to the amount of soybean, preferably 0.2 to 0.3%. The urea solution is preferably in a concentration of from 30 to 50% by weight.

The conditions of the thermal treatment the essential aim of which is the destruction of the antitrypsin vary depending on whether it is desired to produce extracted or unextracted soybean meal.

In the case of oil extracted soybean the flakes impregnated with essence which leave the extractor are at a temperature of 50° C., and the steam treatment rapidly brings them up to the temperature of 65° C., the boiling point of hexane, and then after the disappearance of the solvent the temperature rises to 100–110° C., humidity then attaining 22–25%. Starting from this moment, cooking for less than 10 minutes is sufficient to bring about the destruction of the antitrypsin. The cooked de-oil extracted is then dried.

In the case of unextracted soybean, the flakes leaving the rolling mill at a temperature of about 40° C. are subjected to the action of steam. Their temperature is raised to 100–110° C., their humidity then being 18–20%, and the duration of the thermal treatment starting from this point will be less than 20 minutes. The cooked unextracted soybeans are then dried.

It should be noted that when urea is used, the urease in the soya which will alkalize the product by decomposition of urea is not destroyed when oil is extracted, nor is it destroyed by heat as long as the temperature does not reach 70° C., and when the destruction of the urease has been effected the urea has already been completely converted. The residual doses of urea and ammonia in the final product are very slight and of no importance for feeding purposes.

Another method of alkalizing soybean consists in mixing gaseous ammonia with the cooking steam, this ammonia being eliminated during the drying. It is also possible for a plurality of these methods of alkalization to be used simultaneously.

The product obtained will no doubt not have all the properties of that resulting from the process of U.S. Pat. No. 3,220,851, and in particular it will have lower solubility. Nevertheless, the product of this invention has digestibility equivalent to that obtained in accordance with U.S. Pat. No. 3,220,851.

Unlike the previous process of the applicant, in which a pap of soybean is treated, the process of the invention destroys antitrypsin in slightly moist products, using water contents close to those used in traditional oil works, without using special installations and therefore without giving rise to special expense for drying, as is the case in various other known processes, which do not however bring about the complete destruction of antitrypsin.

EXAMPLES OF THE PREFERRED EMBODIMENTS

The invention will now be further described with reference to the following Examples.

EXAMPLE 1

Soybean cooked with lime in a non-continuous oil extraction installation.

This conventional method of non-continuous soybean extraction (batch process) comprised the following operations:

(1) Crushing the soybeans in a fluted cylinder grinder.
(2) Passing the crushed soybeans through a plate type heater or heating worm enabling the crushed grain to be heated and, if required, slightly humidified by steam or by spraying of water so as to increase its plasticity.
(3) Rolling the soybean between cylinders so as to burst the vegetable cells and obtain the bean in the form of flakes, while avoiding the production of flour.
(4) Methodical extraction in a battery of extractors working by the batch process with the aid of a solvent, which is generally hexane.
(5) After the oil had been extracted by the solvent, the extractor at the top of the battery was drained of solvent and steam was injected beneath the false bottom of the extractor to effect the evaporation of the solvent with which the cakes were impregnated. The injection of water vapour was continued for about 10 minutes after no further solvent vapour was entrained by the steam. In this manner, the top layers in the extractor were cooked with steam at 100–105° C. for 10 minutes with a humidity of 22–25%, while the bottom layers had been cooked for a longer time, which could be as much as 40–50 minutes because of the time necessary for the evaporation of the solvent step by step from bottom to top.

In the method of the invention lime was introduced as a spray of milk of lime into the heating worm between the crushing and the rolling of the soybeans. The lime was introduced with a dosage of 0.2% of the weight of the soybeans, in the form of milk of lime containing 1 kg. of lime per 9 kg. of milk of lime.

When extracted in the cold state in the laboratory, the soybeans used yielded a meal containing 4% of antitrypsin.

An average sample of soybean meal obtained without addition of lime still revealed 0.1% of antitrypsin after hydrochloric treatment, that is to say 2.5% of the original antitrypsin in the soybeans, so that the rate of destruction of antitrypsin amounts to 97.5%.

Longer cooking did not improve this rate.

Because of the incorporation of lime, antitrypsin was no longer detected in the cake and the rate of destruction of antitrypsin consequently attained 100%.

EXAMPLE 2

The operation was carried out in the same manner as in Example 1, but instead of milk of lime a solution of urea was sprayed on over the crushed beans, heated to 40° C. The urea was used with a dosage of 0.3% referred to the weight of the soybeans and was used in the form of an aqueous solution with a concentration of 30%.

100% destruction of antitrypsin was likewise achieved and the soybean meal obtained contained practically no urea and an amount of ammonia only slightly larger than the amount naturally present in soybean meal.

EXAMPLE 3

With the object of obtaining cooked unextracted soybean the same equipment as that used in Examples 1 and 2 was employed for the operations of crushing and rolling. The rolled soybeans contained in the extractor were treated directly with water vapour, without solvent treatment, and cooking was continued for 15 minutes after the water vapour has heated the mass of beans and humidified it and escaped freely into the top part of the extractor. Under these conditions, the temperature of the beans rose to 100–105° C. and the humidity of the beans was brought to 18–20%.

If an alkalizing product was not incorporated, the cooked soybeans contained about 0.1% of antitrypsin, determined as in Example 1.

By the invention, urea was incorporated under the same conditions as in Example 2. 100% destruction of antitrypsin was then achieved.

EXAMPLE 4

The soybeans were prepared by crushing and rolling in the same manner as in the previous Examples. They were treated in a continuous extraction installation and the soybean meal was cooked at the same time as the solvent was eliminated in an apparatus of the type conventional in oil works and which is known as a desolventiser-toaster.

If no alkalizing agent was incorporated, the heating and injection steam was adjusted in the desolventiser-toaster in such a manner that the soybean meal leaves with a humidity of 13% and a temperature of 105° C., with an antitrypsin content of 0.1% determined as in Example 1.

Incorporation of urea in accordance with the invention with a dosage of 0.25% by spraying in the form of a 40% aqueous solution during the heating to 40° C. of the soybeans in the heating worm between the crushing and grinding operations brought the residual content of antitrypsin to zero.

EXAMPLE 5

The operation was carried out in the same conditions as in Example 4, but using dehulled soybeans.

The use of urea under the same conditions likewise permitted 100% destruction of antitrypsin.

EXAMPLE 6

With the object of obtaining a cooked unextracted, dehulled soybeans which had not been de-oiled, husked unextracted, dehulled soybeans were used, which were crushed and rolled as in the previous Examples, while before the grinding of 40% solution of urea was sprayed on the crushed soybeans at a temperature of 35° C. in a proportion such that the rate of incorporation of urea in the beans was 0.2%.

The same continuous extraction equipment was used as in Example 4, but without using a solvent, so that the continuous extractor served only to transport the rolled soybeans to the desolventiser-toaster.

The heating and injection steam were adjusted in this desolventiser-toaster in such a manner that the soybeans impregnated with urea were brought on the top trays to a humidity of 18–20% and to a temperature of 100–105° C. and dried at 105–110° C. on the bottom trays, the passage time in the apparatus being about 30 minutes.

The use of urea made it possible to achieve 100% destruction of antitrypsin, whereas if urea were not used only about 97% of the antitrypsin would be destroyed.

EXAMPLE 7

The operation was carried out under the same conditions as in Example 6, by-passing the continuous extractor by using a conveyor worm.

I claim:

1. A method for preparing soybean products free of antitrypsin, comprising crushing unextracted soybeans containing urease, the humidity of the crushed grains being at most 12%, spraying the crushed soybeans with an aqueous solution of urea, the amount of urea being between 0.1 and 0.4 part per 100 of the soybeans by weight, rolling the sprayed soybeans to obtain flakes thereby improving the distribution of urea, the temperature of the soybeans prior to rolling being no higher than 70° C., and then cooking said flakes in steam with the humidity of the flakes being 18–20% at 100–110° C. until destruction of antitrypsin is obtained.

2. A method as claimed in claim 1, wherein said amount of urea is between 0.2 and 0.3 part per 100.

3. A method as claimed in claim 1, wherein said flakes are cooked for no more than 20 minutes.

4. A method for preparing soybean products free of antitrypsin, comprising crushing unextracted soybeans containing urease, the humidity of the crushed grains being at most 12%, spraying the crushed soybeans with an aqueous solution of urea, the amount of urea being between 0.1 and 0.4 part per 100 of the soybeans by weight, rolling the sprayed soybeans to obtain flakes thereby improving the distribution of urea, the temperature of the soybeans prior to rolling being no higher than 70° C., extracting oil from said flakes, and then cooking said flakes in steam with the humidity of the flakes being 22–25% at 100–110° C. until destruction of antitrypsin is obtained.

5. A method as claimed in claim 4, wherein said amount of urea is between 0.2 and 0.3 part per 100.

6. A method as claimed in claim 4, wherein said flakes are cooked for no more than 10 minutes.

References Cited

UNITED STATES PATENTS

| | | | |
|---|---|---|---|
| 3,155,524 | 11/1964 | Norris et al. | 99—98 |
| 3,220,851 | 11/1965 | Rambaud | 99—98 |
| 2,848,342 | 9/1958 | Atkinson | 106—154 |

RAYMOND N. JONES, Primary Examiner

U.S. Cl. X.R.

426—377, 364